(12) United States Patent
Lellig et al.

(10) Patent No.: US 9,206,299 B2
(45) Date of Patent: Dec. 8, 2015

(54) PVB FILM WITH UV PROTECTION AND LOW YELLOW VALUE FOR LAMINATED SAFETY GLASS

(71) Applicant: KURARAY EUROPE GMBH, Hattersheim (DE)

(72) Inventors: Philipp Lellig, Hattersheim (DE); Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 14/296,595

(22) Filed: Jun. 5, 2014

(65) Prior Publication Data

US 2014/0371356 A1    Dec. 18, 2014

(30) Foreign Application Priority Data

Jun. 14, 2013   (EP) .................................. 13172063

(51) Int. Cl.
| | | |
|---|---|---|
| C08K 5/00 | (2006.01) | |
| C08K 5/11 | (2006.01) | |
| C08K 5/3475 | (2006.01) | |
| B32B 17/00 | (2006.01) | |
| C08K 5/134 | (2006.01) | |

(52) U.S. Cl.
CPC . C08K 5/11 (2013.01); B32B 17/00 (2013.01); C08K 5/0016 (2013.01); C08K 5/1345 (2013.01); C08K 5/3475 (2013.01)

(58) Field of Classification Search
CPC ................................ C08K 5/11; C08K 5/3475
USPC ......................................................... 524/91
See application file for complete search history.

(56) References Cited

U.S. PATENT DOCUMENTS

| | | | |
|---|---|---|---|
| 7,312,275 B2 | 12/2007 | Papenfuhs et al. | |
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 7,985,465 B2 | 7/2011 | Wiedemann et al. | |
| 8,039,112 B2 * | 10/2011 | Keller et al. | 428/436 |
| 2012/0052310 A1 * | 3/2012 | Keller et al. | 428/437 |

FOREIGN PATENT DOCUMENTS

| | | | |
|---|---|---|---|
| DE | 19756274 A1 | 6/1999 | |
| DE | 102010003316 A1 | 9/2011 | |
| EP | 1 606 325 | 12/2005 | |
| EP | 1 527 107 B1 | 6/2007 | |
| EP | 1 795 337 A1 | 6/2007 | |
| EP | 1 977 885 A1 | 10/2008 | |
| JP | 10194796 A * | 7/1998 | C03C 27/12 |
| WO | 03/020776 A1 | 3/2003 | |
| WO | 2004/063231 A1 | 7/2004 | |

OTHER PUBLICATIONS

Translation of JP 10-194796, Jul. 28, 1998.*

* cited by examiner

*Primary Examiner* — Hui Chin
(74) *Attorney, Agent, or Firm* — Brooks Kushman P.C.

(57) ABSTRACT

A polyvinyl acetal film contains at least one plasticizer and 0.01-1.5% by weight of at least one UV absorber of Formula 1

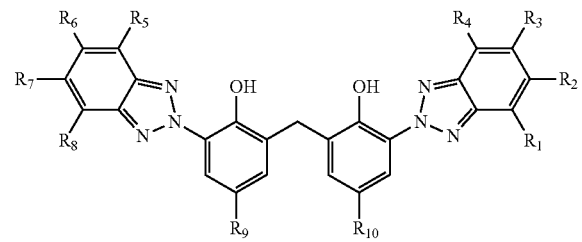

(1)

where
$R_1$, $R_2$, $R_3$, $R_4$, $R_5$, $R_6$, $R_7$, $R_8$ are H, halogen, $C_{1-20}$ alkyl, hydroxyalkyl, or alkoxyalkyl, and
$R_9$, $R_{10}$ are branched or unbranched $C_{1-50}$ alkyl, hydroxyalkyl, or alkoxyalkyl groups. The films can be used as museum glazing, display window glazing, as motor vehicle glazing, aircraft glazing, in photovoltaic modules, in LED or OLED screens, televisions, computer screens, big screens, in electrochromic glass elements, photochromic glass elements, and photoelectrochromic glass elements.

16 Claims, 1 Drawing Sheet

PVB FILM WITH UV PROTECTION AND LOW YELLOW VALUE FOR LAMINATED SAFETY GLASS

CROSS-REFERENCE TO RELATED APPLICATIONS

This application claims priority to European Patent Application No. 13172063.3 filed Jun. 14, 2013, the disclosure of which is incorporated in its entirety by reference herein.

BACKGROUND OF THE INVENTION

1. Field of the Invention

The invention relates to plasticizer-containing films based on polyvinyl acetal with UV protection and low yellow value and to glass laminates produced therewith.

2. Background Art

Commercially available plasticizer-containing polyvinyl butyral film (PVB film) for laminated glazings has been provided with UV absorbers for many decades so that UV radiation cannot penetrate through the laminated glass completely, in contrast to visible light. Protection against harmful UV radiation for individuals or objects located behind the laminated glass can thus be ensured in a simple manner. Besides the protection against cuts, this constitutes the main property advantage compared with monolithic glass, since this is largely transparent to UV radiation.

Derivatives of 2-hydroxyphenyl benzotriazole have proven their worth and are used in a widespread manner as UV absorbers and are obtainable using different substitution patterns, for example under the trade names Tinuvin P, Tinuvin 328, Tinuvin 327 and Tinuvin 326. The benzotriazole type UV absorbers mentioned here are known in PVB films for their excellent long-term stability, good solubility and high absorption capacity over almost the entire UV range. Furthermore, the specified UV absorbers can be introduced particularly easily into the film composition during the extrusion process since they are also relatively well soluble even in the plasticizers used conventionally, such as 3G8, and can thus be easily added to the plasticizer before extrusion. In addition, the above-mentioned UV absorbers have melting points that lie significantly below the extrusion temperature approximately 200° C. conventional with PVB film. These solubility and melting properties of the specified UV absorbers are promoted by the relatively low molecular weight thereof. This, together with the good solubility in the film matrix, also leads however to a high migration ability therein. Particularly in the field of architecture, laminated safety glass (LSG), once installed, is only replaced in some circumstances after a number of decades, and therefore the question is raised as to whether permanent UV protection can be maintained with creeping loss of UV absorber via the open edges of the LSG.

In addition, properties that are harmful to health or the environment have been attributed to some of the aforementioned benzotriazole UV absorbers. Accordingly, it is undesirable if, when wiping down LSG elements (for example as part of a glass counter on which food is served), even just small quantities of UV absorber are dispensed via the edges with each wiping process and are then distributed over the surface.

Depending on the substitution pattern of the specified UV absorbers, absorption also takes place in the visible range of the spectrum to a greater or lesser extent in addition to absorption in the UV range, such that these UV absorbers cause a certain yellowing of the PVB film depending on the quantity used and substituent distribution. Here, it has been found that, with identical quantities, the influence on yellowing of the film decreases among Tinuvin 326, Tinuvin 327, Tinuvin P and Tinuvin 328. Nevertheless, there is a need for alternative UV absorbers, which, with a UV filter effect equal to or better than UVA 328, contribute even less to yellowing.

Besides UV absorbers, polyvinyl butyral is often provided with phenolic antioxidants, of which the purpose is to inhibit radical cleavage reactions triggered by high processing temperatures during film extrusion. The length of the polymer chains is thus kept substantially constant, so that the mechanical properties of the extruded material are not impaired as a result of the extrusion process.

Many phenolic antioxidants are associated however with the disadvantage of also causing yellowing, depending on the extrusion conditions, which can be attributed to reaction products of the antioxidants. Even in a finished PVB film already adhesively bonded between two glass panes, phenolic antioxidants can cause subsequent yellowing under UV irradiation, in particular with long-term increased temperature, which is not only undesirable for aesthetic reasons, but also reduces the light transmission of the glass laminate over time.

The most commercially significant group of phenolic antioxidants for the production of PVB film contains the partial structure (3,5-di-tert-butyl-4-hydroxyphenyl)propionate and leads to yellowing with use in PVB film with UV and/or temperature influence in the glass laminate. Compounds having this partial structure are offered under the trade names Irganox 1010, Irganox 1076, Irganox 1035 and Hostanox O 3.

SUMMARY OF THE INVENTION

The problem addressed by the present invention was to provide an adhesive film for laminated glass which in the laminate, has low UV transmission and a particularly low yellow value and in which a UV absorber contained therein has a low tendency toward migration.

DETAILED DESCRIPTION OF THE PREFERRED EMBODIMENT(S)

Figure 1:
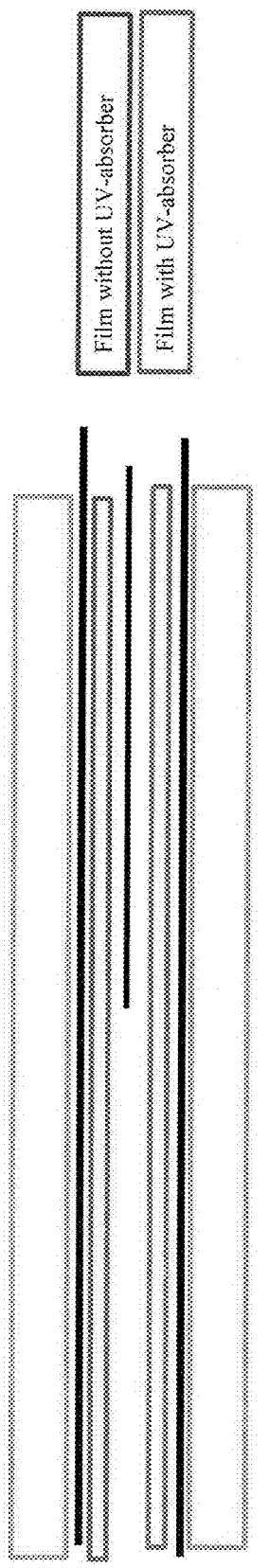
FIG. 1 illustrates one embodiment of a test laminate for determining UV absorber migration.

The present invention therefore relates to a film containing at least one polyvinyl acetal, at least one plasticizer, and 0.01-1.5% by weight of a UV absorber of Formula 1

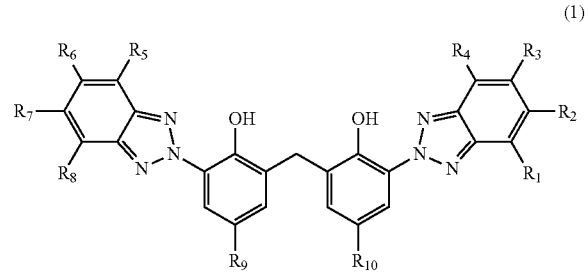

where
$R_1, R_2, R_3, R_4, R_5, R_6, R_7, R_8, R_9, R_{10}$ are H or halogen, or alkyl, hydroxyalkyl or, alkoxyalkyl groups in each case with 1-20 carbon atoms, $R_9$, $R_{10}$ are branched or unbranched alkyl, hydroxyalkyl, or alkoxyalkyl radicals in each case with 1-50 carbon atoms.

It has surprisingly been found that, with use of a UV absorber according to Formula 1, a film that is free from clouding after lamination, has low UV transmission and at the same time has low yellowness value can be obtained in spite of high molecular weight and poorer solubility in plasticizers compared with the known UV absorbers. This is all the more surprising since the melting point of the UV absorber may even lie in the range of the extrusion temperature of the film without observance of clouding or an increase in the yellowness value.

UV absorbers according to Formula 1 with a melting point of above 100° C., above 120° C., above 140° C. and most preferably of 160° or above are therefore preferably used.

Films according to the invention preferably contain, as a UV absorber according to Formula 1, the compound (2,2'-methanediylbis[6-(2H-benzotriazol-2-yl)-4-(2,4,4-trimethylpentan-2-yl)phenol), CAS No. 103597-45-1 or as illustrated below:

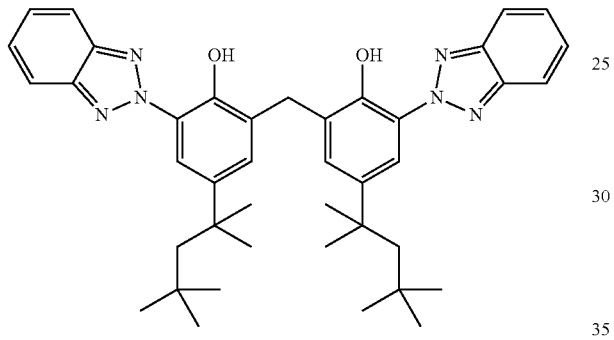

This compound is commercially available for example from BASF SE under the trade name Tinuvin 360.

The invention further relates to a method for producing a film as defined above by mixing polyvinyl acetal, at least one plasticizer and the at least one UV absorber of Formula 1 in solid form in a mixing apparatus and by subsequently extruding the obtained mixture. Mixers, extruders or kneaders can be used as a mixing apparatus. Extruders in which the obtained mixture is extruded by means of a sheet die to form the film are suitable in particular. Here, the mixing may take place in the front part of the extruder, wherein the melting and shaping occurs in the further part of the extruder.

Here, the UV absorber present in solid form can be fed for example directly as powder or granulate into the feed region of an extruder. The UV absorber present in solid form may optionally also be fed after being premixed with a polyvinyl acetal present in the form of powder or granulate.

The UV absorber is preferably fed to the mixing apparatus however in a form suspended in a carrier liquid such as the plasticizer.

Films according to the invention preferably contain at least one UV absorber according to Formula (1) in a quantity from 0.01 to 1.5% by weight, more preferably in a quantity from 0.05 to 0.80% by weight, and most preferably in a quantity from 0.10 to 0.50% by weight.

In a second variant of the invention the films additionally contain at least one antioxidant in a quantity from 0.005 to 0.5% by weight.

With the inventive use of the UV absorber of Formula 1, the film material is subjected to a reduced proportion of UV-A radiation. This may mean that yellow-coloured decomposition products originating from specific antioxidants are no longer bleached by radiation. Antioxidants that do not form such degradation products, such as antioxidants that do not contain a (3,5-di-tert-butyl-4-hydroxyphenyl)propionate partial structure or a structure or partial structure of the Hostanox O 3 type, i.e. those which contain a residue of 3,3-bis-(4'-hydroxy-3'-t-butylphenyl)butanoic acid, are therefore preferably used. Such compounds are commonly esters. Antioxidants that contain these partial structures already tend toward yellowing to some extent during the extrusion process.

In a third variant of the invention the film contains less than 1500 ppm of antioxidants of Formula (2) or having the partial structure (3,5-di-tert-butyl-4-hydroxyphenyl)propionate or the partial structure of the Hostanox O 3 type.

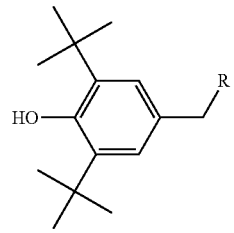

(2)

where R is a hydrocarbon radical of a polyfunctional alcohol, an oligoglycol with 1 to 10 glycol units, a hydrocarbon radical with 1 to 20 carbon atoms, an N, P, and/or S-substituted hydrocarbon radicals with 1 to 30 carbon atoms, or carboxylic acid ester group with 1 to 30 carbon atoms in the alcohol group.

The film according to the invention preferably contains the specified antioxidants only in a low proportion, that is to say preferably no more than 1000 ppm, more preferably no more than 500 ppm, yet more preferably no more than 250 ppm, no more than 100 ppm, and no more than 50 ppm. The film according to the invention most preferably does not contain the specified antioxidants at all, that is to say 0 ppm.

Examples of compounds of Formula (2) which are not used in the third variant or which are only used in the specified proportions are those having the following CAS numbers: 2082-79-3, 12643-61-0, 35074-77-2, 23128-74-7, 976-56-7, 65140-91-2, 1709-70-2, 34137-09-2, 27676-62-6, 6683-19-8, 41484-35-9, 991-84-4, 63843-89-0, 4221-80-1 or 67845-93-6.

Further examples of compounds of Formula (2) which are not used in the third variant or which are only used in the specified proportions are those according to the following structural formulas:

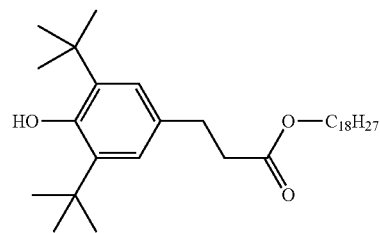

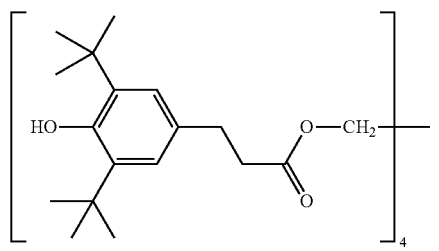

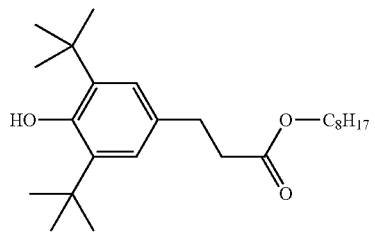

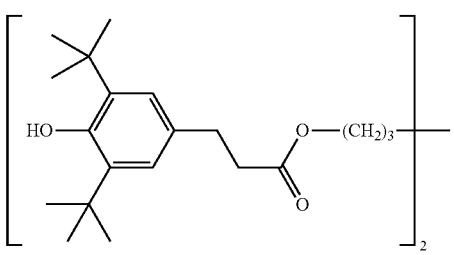

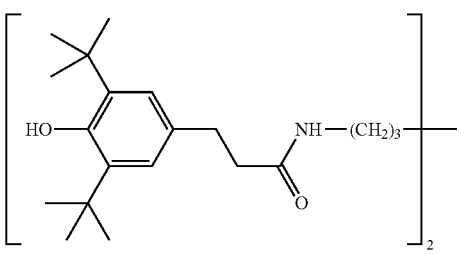

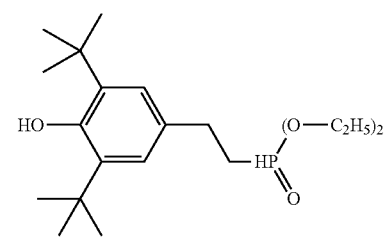

Compounds of this type can be found for example in the "Plastics Additives handbook" 5th Edition, Hanser publishing house, in the chapter "Primary antioxidants".

In a fourth variant of the invention antioxidants which do not contain the partial structure (3,5-di-tert-butyl-4-hydroxyphenyl)propionate or the structure of the Hostanox O 3 type can be contained in the film in a quantity from 0.005 to 0.5% by weight, preferably 0.02 to 0.15% by weight and most preferably 0.03 to 0.1% by weight.

Such suitable antioxidants are, for example, compounds of Formula (3) or binuclear phenolic antioxidants of the Lowinox 44B25 or Irganox 129 type, mononuclear antioxidants of the Songsorb 2908 (CAS: 67845-93-6), BHT (CAS: 128-37-0), or p-octylphenol type, or multi-nuclear phenolic antioxidants, such as Topanol CA (CAS: 1843-03-4) or Wingstay L (31851-03-3).

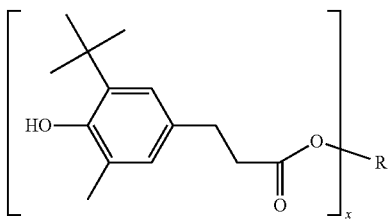

where R is a hydrocarbon radical of a polyfunctional alcohol, an oligoglycol with 1 to 10 glycol units, or a hydrocarbon radical with 1 to 20 carbon atoms and x is 1, 2, 3 or 4.

Phenolic antioxidants which contain one or more sulphur atoms, but do not contain the partial structure (3,5-di-tert-butyl-4-hydroxyphenyl)propionate or the partial structure of the Hostanox O 3 type, can likewise be considered.

Antioxidants according to Formula (3) may be, in particular, triethylene glycol-bis-3-(3-tert-butyl-4-hydroxy-5-methylphenyl)propionate, CAS-No. 36443-68-2. This is commercially obtainable for example from Songwon as "Songnox 2450" or from BASF SE as "Irganox 245".

Of course, further similar structures which can be used accordingly within the scope of the invention can be generated in a simple manner by variation of the substituents.

At the same time, the yellow ("yellowness") value (db) of films according to the invention is less than 2, preferably less than 1.5, more preferably less than 1, yet more preferably less than 0.6, and most preferably less than 0.4. The yellow value (db) of the films according to the invention is determined on a laminate consisting of the film with a thickness of 0.76 mm between two panes of clear glass having a thickness of 2 mm. The colour contribution of the glass is measured by measuring an identical glass pair without film as reference.

The yellowness of the film can also be determined by the transmission of the film in accordance with EN 410 at 430 nm. In particular, films according to the invention, with a thickness of 0.76 mm in a laminate between two panes of clear glass (for example Planilux) each having a thickness of 2 mm, therefore have a light transmission at 430 nm according to EN 410 of greater than 75%, preferably, in order of increasing preference, of greater than 80%, 85%, 86%, 87% or 88%.

The yellow value (db) or the transmission according to EN 410 at 430 nm of films having a different thickness can be determined at the reference thickness 0.76 after careful working (for example laminating 2×0.38 mm films above one another, pressing a film 1.52 mm thick to the thickness 0.76, peeling from, or up to, the thickness 0.76).

In addition to the use of suitable UV absorbers and antioxidants, the setting of a low alkali titre of the films according to the invention can result in improved natural colour and photothermal stability of the film according to the invention.

The alkali titre, as specified in the examples, is determined by neutralisation of the film according to the invention with hydrochloric acid and is preferably between 2 and 70, in particular between 3 and 50, and most preferably between 5 and 30.

The alkali titre can be set by corresponding neutralisation of the polyvinyl acetal during or after production thereof by acetalisation of polyvinyl alcohol or by addition of metal salts to the mixture according to the invention. With the use of the films according to the invention for laminated glass laminates, the metal salts generally also act as anti-stick agents.

Films according to the invention may contain alkaline earth metal ions, zinc ions, aluminium ions or alkali metal ions as anti-stick agents. These are present in the mixture/film in the form of salts of monovalent or polyvalent inorganic or monovalent or polyvalent organic acids. Examples of counterions include, for example, salts of organic carboxylic acids, such as formates, acetates, trifluoracetates, propionates, butyrates, benzoates, 2-ethylhexanoates etc., wherein carboxylic acids with fewer than 12 C atoms, preferably fewer than 8, more preferably fewer than 6, still more preferably fewer than 4 and most preferably with fewer than 3 C atoms are preferably used. Examples of inorganic counterions include chlorides, nitrates, sulphates and phosphates. Further counterions may be anions to be assigned to the surfactants, such as sulfonates or phosphate surfactants.

The films of the invention preferably contain more than 5 ppm, more preferably more than 10 ppm, yet more preferably more than 15 ppm, still more preferably more than 20 ppm, and most preferably more than 25 ppm, of ions selected from the group Be, Mg, Ca, Sr, Ba, zinc and aluminium. In order to avoid undesired clouding, no more than 250 ppm of the specified polyvalent metals should be present, however.

At the same time, the content of alkali metal ions (Li, Na, K, Rb, Cs, Fr) in the plasticizer-containing film based on polyvinyl acetal is to be as low as possible. The film preferably contains less than 150 ppm, more preferably less than 100 ppm, yet more preferably less than 75 ppm, still more preferably less than 50 ppm, yet still more preferably less than 25 ppm, even further preferably less than 10 ppm, and most preferably less than 5 ppm of alkali metal ions.

It has surprisingly been found that increased quantities of benzotriazole UV absorber according to Formula 1 used in accordance with the invention do not negatively influence adhesion performance in spite of the capability of said UV absorber to complex bivalent metal ions. In particular, it is possible to set reduced adhesion levels, as are necessary with the use of PVB/glass laminates in the automotive field in order to obtain sufficient penetration strength. Here, films according to the invention in the laminate between two panes of clear glass (2.1 mm Planilux®) have shear strengths of from 6-30 N/mm², preferably of 8-20 N/mm² and in most preferably of 9-16 N/mm².

The polyvinyl acetals used in accordance with the invention are obtainable as acetalization products of polyvinyl alcohol (PVA) with aldehydes, such as butyraldehyde. Films according to the invention may contain one or more polyvinyl acetals, which can differ in terms of molecular weight, degree of acetalisation, residual alcohol content, or number of carbon atoms in the acetal group.

Furthermore, the specified favourable optical properties of the film according to the invention can be improved by selection of the polyvinyl alcohol (PVA) used to produce the polyvinyl acetal. If, at the stage of the PVA, unsaturated units are present in the polymer chain as flaws, these will necessarily also be found again in the polyvinyl acetal produced therefrom, whereby the absorption of UV radiation of said polyvinyl acetal is increased and the light stability thereof is impaired. The unsaturated units may be present in the form of isolated double bonds or double bonds provided in conjugation with one another or in conjugation with carbonyl bonds. These unsaturated units can be detected in the PVA by UV spectroscopy.

Very high proportions of flaws lead to extinctions at 280 mm of close to 1 as measured in a 4% by weight PVA solution in water. Polyvinyl alcohols having extinction values in a 4% by weight aqueous solution at 280 nm of less than 0.5, preferably less than 0.3, more preferably less than 0.2, and most preferably less than 0.1, are therefore preferably used for the production of polyvinyl acetal used in accordance with the invention.

In addition to the use of the UV absorber according to Formula 1 and the use of phenolic antioxidants not tending toward yellowing and/or the use of polyvinyl acetals having particularly few flaws and/or the setting of the alkali titre, the films according to the invention can be provided with one or more light stabilisers, in particular with sterically hindered amines of the HALS type and/or sterically hindered amino ethers (NOR-HALS).

Films according to the invention preferably contain 0.005-1% by weight, more preferably 0.01-0.5% by weight, yet more 0.03-0.3% by weight and most preferably 0.05-0.25% by weight, of sterically hindered amines of the HALS or NOR-HALS type as light stabilisers.

Particularly suitable sterically hindered amines are those of general Formulas (5), (6) and/or (7).

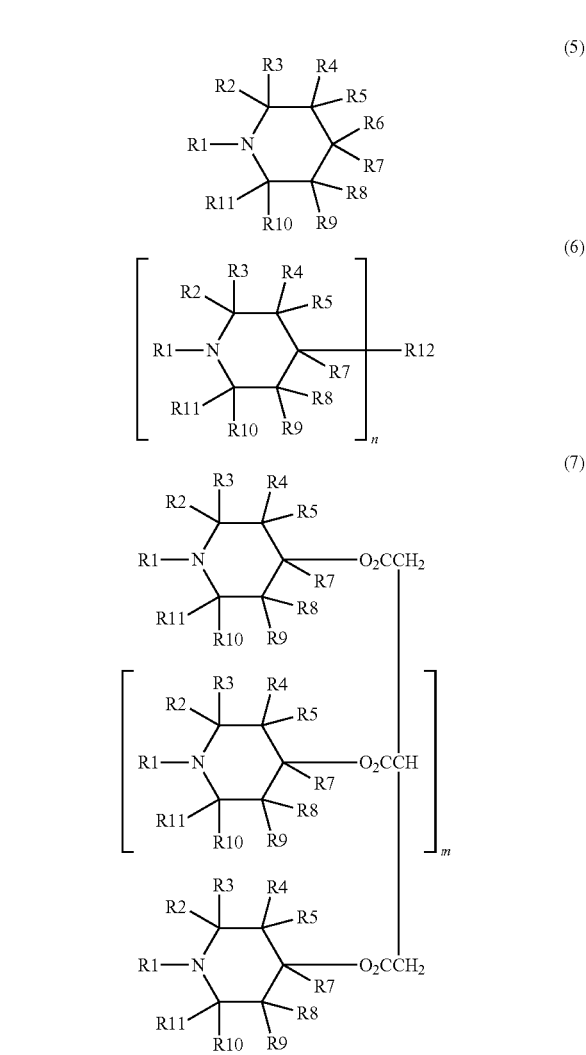

where R1, R2, R3, R4, R5, R6, R7, R8, R9, R10, R11 are H, C1-C20 alkyl, hydroxyalkyl, alkoxyalkyl, acyloxyalkyl, in each case unsubstituted or substituted by aldehyde groups, keto groups or epoxy groups, R12 is a covalent bond, C1-C20 alkyl, hydroxyalkyl, alkoxyalkyl, or acyloxyalkyl, in each case unsubstituted or substituted by aldehyde, keto or epoxy groups, n is 2-4 and m is 1-10.

Compounds of this type are commercially available, for example as the products Tinuvin 123 (NOR-HALS), Tinuvin 144, Tinuvin 622, Tinuvin 770 and the di-N-methylated derivative thereof from BASF (Ciba Specialities). For example, Songlight 2920 from Songwon International, ADK Stab LA-57, LA-52 or LA-62 from Asahi Denka Co. or UVINUL 4050 H from BASF SE are particularly well suited.

In order to produce polyvinyl acetal, polyvinyl alcohol is dissolved in water and is acetalised with an aldehyde, such as butyraldehyde, formaldehyde or propionaldehyde, with addition of an acid catalyst. The precipitated polyvinyl acetal is separated off, washed neutral, optionally suspended in an aqueous medium set to an alkaline pH, then washed neutral again and dried.

The acid used for acetalisation must be neutralised again after the reaction. A low content of alkali metal ions can be achieved, inter alia, with the synthesis of the polyvinyl acetal by dispensing with the sodium hydroxides or potassium hydroxides or carbonates used conventionally to neutralise the catalyst or by thorough washing of the polyvinyl acetal obtained with the acetalisation. Alternatively to the bases NaOH or KOH, the catalyst acid from the acetalisation step can be neutralised for example by injecting carbon dioxide or ethylene oxide.

The polyvinyl alcohol content of the polyvinyl acetal can be set by the quantity of the aldehyde used in the acetalisation.

It is also possible to carry out the acetalisation with other or further aldehydes with 2-10 carbon atoms (for example valeraldehyde).

The films based on plasticizer-containing polyvinyl acetal preferably contain uncrosslinked polyvinyl butyral (PVB), which is obtained by acetalisation of polyvinyl alcohol with butyraldehyde.

The use of crosslinked polyvinyl acetals, in particular crosslinked polyvinyl butyral (PVB) is also possible. Suitable crosslinked polyvinyl acetals are described for example in EP 1527107 B1 and WO 2004/063231 A1 (thermal self-crosslinking of polyvinyl acetals containing carboxyl groups), EP 1606325 A1 (polyvinyl acetals crosslinked with polyaldehydes) and WO 03/020776 A1 (polyvinyl acetals crosslinked with glyoxylic acid). The disclosure of these patent applications is incorporated herein fully by reference.

Within the scope of the present invention, terpolymers formed of hydrolysed vinyl acetate/ethylene copolymers can also be used as a polyvinyl alcohol. These compounds are generally hydrolysed to more than 98 mol % and contain 1 to 10% by weight of units based on ethylene (for example "Exceval" type from Kuraray Europe GmbH).

Within the scope of the present invention hydrolysed copolymers formed from vinyl acetate and at least one further ethylenically unsaturated monomer can also be used as a polyvinyl alcohol.

Within the scope of the present invention, the polyvinyl alcohols may be used in pure form or in the form of a mixture of polyvinyl alcohols having a different degree of polymerisation or degree of hydrolysis.

Besides the acetal units, polyvinyl acetals also contain units resulting from vinyl acetate and vinyl alcohol. The polyvinyl acetals used in accordance with the invention have a polyvinyl alcohol content of 12-24% by weight, preferably 14-23% by weight, more preferably of 16-22% by weight, yet more preferably of 17-21% by weight, and in particular, 18-20% by weight.

The polyvinyl acetate content of the polyvinyl acetal used in accordance with the invention is preferably below 5% by weight, more preferably below 3% by weight, yet more preferably below 1% by weight, still more preferably below 0.75% by weight, yet still more preferably below 0.5% by weight, and in particular below 0.25% by weight.

The degree of acetalisation can be calculated from the polyvinyl alcohol proportion and the residual acetate content.

The films preferably have a total plasticizer content, that is to say the proportion of all plasticizers in the film, in order of increasing preference, in the range of 5-45% by weight, 12-36% by weight, 14-32% by weight, 16-30% by weight, and in particular 20-28% by weight. Films according to the invention or laminates bonded therewith may contain one or more plasticizers.

Well-suited plasticizers for the films according to the invention include one or more compounds selected from the following group: di-2-ethylhexyl sebacate (DOS), di-2-ethylhexyl adipate (DOA), dihexyl adipate (DHA), dibutyl sebacate (DBS), triethylene glycol-bis-n-heptanoate (3G7), tetraethylene glycol-bis-n-heptanoate (4G7), teriethylene glycol-bis-2-ethylhexanoate (3GO or 3G8), tetraethylene glycol-bis-n-2-ethylhexanoate (4GO or 4G8), di-2-butoxyethyl adipate (DBEA), di-2-butoxyethoxyethyl adipate (DBEEA), di-2-butoxyethyl sebacate (DBES), di-2-ethylhexyl phthalate (DOP), di-isononyl phthalate (DINP), triethylene glycol-bis-isononanoate, triethylene glycol-bis-2-propyl hexanoate, tris (2-ethylhexyl)phosphate (TOF), 1,2-cyclohexane dicarboxylic acid diisononyl ester (DINCH), diisononyl adipate (DINA) and dipropylene glycol benzoate.

Plasticizers of which the polarity, expressed by the formula $100 \times O/(C+H)$, is less than/equal to 9.4 are most particularly suited, wherein O, C and H stand for the number of oxygen, carbon and hydrogen atoms in the respective molecule. The following table shows plasticizers that can be used in accordance with the invention and the polarity values thereof according to the formula $100 \times O/(C+H)$.

| Name | Abbreviation | $100 \times O/(C+H)$ |
|---|---|---|
| di-2-ethylhexyl sebacate | (DOS) | 5.3 |
| diisononyl adipate | (DINA) | 5.3 |
| 1,2-cyclohexane dicarboxylic acid diisononyl ester | (DINCH) | 5.4 |
| di-2-ethylhexyl adipate | (DOA) | 6.3 |
| dihexyl adipate | (DHA) | 7.7 |
| dibutyl sebacate | (DBS) | 7.7 |
| triethylene glycol-bis-2-propyl hexanoate | | 8.6 |
| triethylene glycol-bis-i-nonanoate | | 8.6 |
| di-2-butoxyethyl sebacate | (DBES) | 9.4 |
| triethylene glycol-bis-2-ethylhexanoate | (3G8) | 9.4 |

Furthermore, the mixtures or films according to the invention may additionally contain further additives, such as antistatic agents, fillers, IR-absorbing nanoparticles or chromophores, dyes, surface-active substances, bleaching agents, stabilisers, acid/base buffers, chelating agents, compounds containing epoxy groups, pigments and adhesion regulators.

Films according to the invention can be used to produce laminated glass, that is to say to adhere at least two glass panes or as a ply connecting a glass pane to a further transparent rigid or flexible layer. Such glazings can be used advantageously where there is a need for good UV protection with simultaneously high transparency in the visible range of light, for example in office buildings, public buildings, such as schools museums, display window glazing, motor vehicles (windscreens, side glazing, glass roofs and rear windows) or aircraft glazing. The films according to the invention can also be used as an LSG component in the interior of office buildings, restaurants, bathrooms, public toilets, etc. In particular, the films according to the invention can also be used in functional components, such as photovoltaic modules (particularly for those with organic solar cells), display applications (LED or OLED screens, televisions, computer screens, big screens), switchable glass elements (particularly electrochromic, photochromic and photoelectrochromic glass elements or glass elements of the suspended particle device type or thermotropic glass elements).

In the specified functional components, at least one layer of the film according to the invention protects an active layer located therebehind against damage caused by sunlight or UV radiation. In the case of photochromic layers, the response behaviour thereof additionally can be modified by filtering out the UV proportion of the solar radiation, the response behaviour of the photochromic layers then being influenced more heavily by visible light than by UV radiation.

Test and Measurement Methods:

The irradiation properties (light transmittance TL, UV transmittance TUV, each expressed in %) of the film laminated between 2×2.1 mm Planilux® in a thickness of 0.76 mm were determined in accordance with DIN EN 410 (2011) using a Perkin-Elmer Lambda 950 UV/VIS spectrometer.

To determine the yellow value of the extruded film, a laminated glass with film of thickness 0.76 mm with two panes of 2.1 mm Planilux® was measured using the ColorQuest XE set to Hunterlab 2°/C. In the method, the natural colour of the glass is subtracted by measuring the two panes of identical glass batch as zero sample, and the contribution of the intermediate layer to the yellow colouring is established numerically as the yellow value db.

Figure 2:
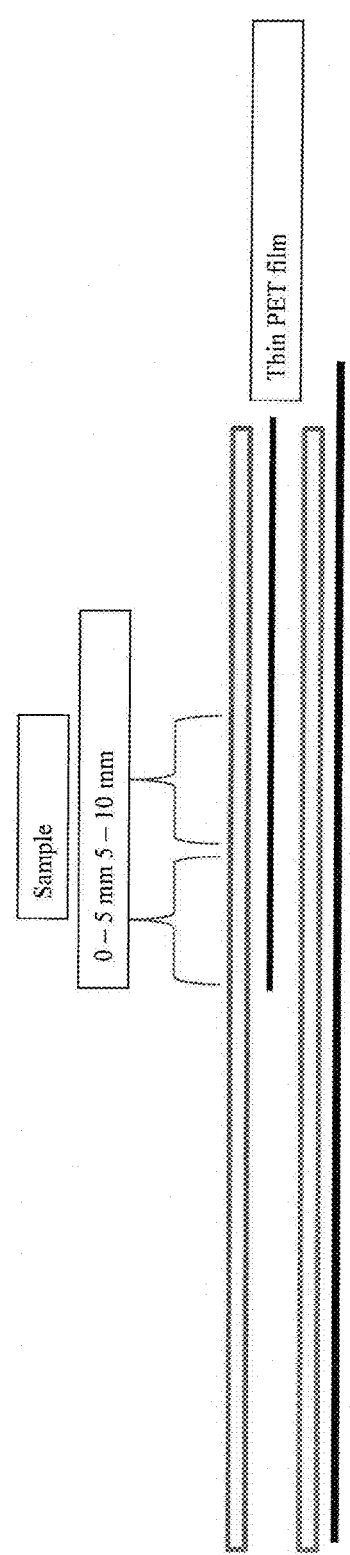
FIG. 2 provides further detail of a test method for determining UV absorber migration.

To compare the migration behaviour of UV absorbers in PVB film, the following approach was adopted:

A PVB film 0.76 mm thick was produced using the same plasticizer as in the film, which contains the UV absorber to be tested. This film serves as a migration sink and is initially free from UV absorber. This film and the film with the UV absorber to be tested were then combined as follows to form a sandwich (FIG. 1):

2 mm glass layer as supporting element
PET film 100-200 µm thick as supporting element
film without UV absorber
PET film approximately 50 µm thin (for example Southwall XIR 75): over half the area film with UV absorber
PET film 100-200 µm thick as supporting element
2 mm glass layer as supporting element The glasses and the two outer layers of PET serve here merely to enable a normal composite production inclusive of an autoclave step, but simultaneously to ensure simplified sample preparation by removal of the outer PET. Due to the provision of the thin PET film over half the area, the two PVB films are directly glued to one another in one half of the film stack, whereas they are separated in the other side of the film stack by the thin PET film. Here, the thin PET film functions in this half as a migration barrier for plasticizer and UV absorber. After production of a pre-composite in a vacuum bag conventional in the industry, the test laminates are subjected to a conventional autoclave process with a total duration of 90 minutes, a maximum pressure of 12 bar and a maximum temperature of 140° C. maintained over 30 minutes. The test laminates are then initially stored at RT for a sufficiently long period of time (for example 48 h) in order to prevent air from bubbling out again. The test laminates are then stored for 4 weeks in a hot cupboard at 100° C. The migration of UV absorber from the PVB layer containing said UV absorber into the PVB layer free from said UV absorber takes place during this period. By removing a film sample from the originally UV-absorber-free PVB layer at a defined distance from the edge of the thin PET film (5-10 mm, FIG. 2) and quantifying the migrated UV absorber, it is possible to determine the migration tendency comparatively. The quantification is performed with the aid of gas chromatography analysis or photometrically with use of specific absorption bands of the UV absorber in question.

To assess the adhesion of a PVB film, the compression shear test was carried out in conformity with DE 19756274 A1 on a glass/glass laminate. For this purpose, 10 samples measuring 25.4×25.4 mm were fixed at an angle of 45° with a feed rate of 2.5 mm/min in a test apparatus according to DE 19756274 A1 and measured. The maximum force required to shear the film from the glass, based on the sample area, was then averaged over the 10 samples.

The melting points of UV absorbers according to the invention can be measured using a semi-automatic melting-point determining apparatus of the "Mettler FP5" type. Here, three melting-point tubes (outer diameter 1.55 mm, inner diameter 1.15 mm, length 80 mm) per material were each filled approximately 1 cm high with the sample. The heating rate of 1°/min starts 10° below the expected melting point. Details concerning the melting points can also often be found in the technical datasheets provided by the manufacturers of UV absorbers.

EXAMPLES

Films were produced using the mixtures having the compositions specified in the following table and were processed and tested as laminate between 2 glass panes of the Planilux® type 2.1 mm thick. The extrusion temperature in all cases was 200° C. In Comparative Examples 2-4, the UV absorber could be dissolved in the plasticizer and added to the extrusion mixture. In Example 1 the UV absorber was merely suspended in the plasticizer.

In comparison to Comparative Examples 2-4, Example 1 demonstrates a very favourable compromise of low yellow value and low UV transmission. Surprisingly, a very low haze value was also additionally obtained, although the UV absorber according to the invention has a melting point of >190° C. and the extrusion was carried out at just 200° C. Surprisingly, the UV absorber according to the invention additionally tends much less toward migration than that from Comparative Example 2.

The abbreviations in the table have the following meanings:
PVB polyvinyl butyral
3G8 triethylene glycol-bis-2-ethyl hexanoate
DBEA di-2-butoxy ethyl adipate (possibly in a mixing ratio by weight with 3G8)
TL light transmittance TL in accordance with EN 410 (380-780 nm)
Db yellow value db established via XE
(a) Measurements in % by Weight are Based on the Film

TABLE 1

|  | Example 1 | Comparison 2 | Comparison 3 | Comparison 4 |
|---|---|---|---|---|
| UV-absorber type | UVA 360 | UVA 328 | UVA P | UVA 326 |
| thickness of the extruded film | 0.76 mm | 0.76 mm | 0.76 mm | 0.76 mm |
| PVB (Mowital F1) | 72.5 | 72.5 | 72.5 | 72.5 |
| plasticizer 3G8 | 25 | 25 | 25 | 25 |
| plasticizer DBEA | 2.5 | 2.5 | 2.5 | 2.5 |
| Tinuvin 360 | 0.15 | | | |

TABLE 1-continued

|  | Example 1 | Comparison 2 | Comparison 3 | Comparison 4 |
|---|---|---|---|---|
| Tinuvin 328 |  | 0.15 |  |  |
| Tinuvin P |  |  | 0.15 |  |
| Tinuvin 326 |  |  |  | 0.15 |
| Mg-Acetate x 4 H2O | 0.0375 | 0.0375 | 0.0375 | 0.0375 |
| Irganox 245 | 0.0365 | 0.0365 | 0.0365 | 0.0365 |
| BHT | 0.05 | 0.05 | 0.05 | 0.05 |
| Optical tests on laminates 2 × 2.1 mm Planilux | | | | |
| Light transmittance TL [EN410] | 90.5 | 91.5 | 91.5 | 90.0 |
| Colorquest yellow value db | 0.18 | 0.17 | 0.2 | 0.41 |
| clouding haze | 0.12 | 0.12 | 0.3 | 0.25 |
| UV transmission (300-380; EN410: 2011) in % | 0.15 | 0.33 | 0.94 | 0.00 |
| Migration test 4 weeks at 100° C. | | | | |
| UVA % by weight in zone 5-10 mm | 0.0042 | 0.0197 | — | — |
| UVA % relative to original concentration in source film | 2.80% | 13.13% | — | — |
| Compression shear test on laminate with 2 × 2.1 mm Planilux | | | | |
| N/mm2 | 12.4 | 11.6 | — | — |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of producing a film comprising at least one polyvinyl acetal; at least one plasticizer; 0.01-1.5% by weight of at least one UV absorber of Formula 1

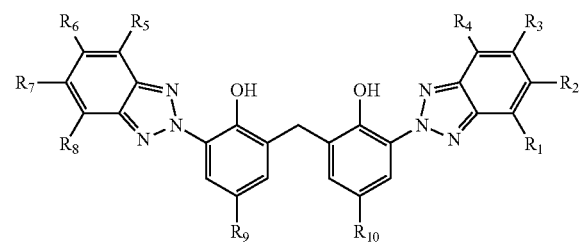

where
R$_1$, R$_2$, R$_3$, R$_4$, R$_5$, R$_6$, R$_7$, and R$_8$ are H, halogen, or C$_{1-20}$, alkyl, hydroxyalkyl, or alkoxyalkyl groups, and
R$_9$, R$_{10}$ are branched or unbranched C$_{1-50}$ alkyl, hydroxyalkyl, or alkoxyalkyl groups, and at least one mononuclear phenolic antioxidant, binuclear phenolic antioxidant, or multinuclear phenolic antioxidant in an amount of from 0.005 to 0.5 weight percent, wherein the mono-, bi- and multinuclear phenolic antioxidants do not contain a partial structure (3,5-di-tert- butyl-4-hydroxyphenyl)propionate or a structure containing a residue of 3,3-bis-(4'-hydroxy-3'-t- butylphenyl)butanoic acid,
said method comprising mixing the polyvinyl acetal, plasticizer, and antioxidant with the UV absorber in solid form in a mixing apparatus and subsequently melting and extruding the mixture thus obtained, wherein the UV absorber is fed to the mixing apparatus as a solid suspended in a carrier liquid.

2. The method of claim 1, wherein compounds of Formula (3)

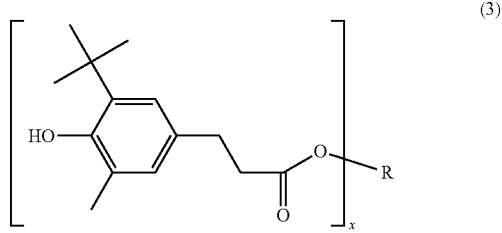

where R=hydrocarbon radical of a polyfunctional alcohol, oligoglycols with 1 to 10 glycol units or hydrocarbon radical with 1 to 20 carbon atoms and X=1, 2, 3 or 4 are used as antioxidants which do not contain the partial structure (3,5-di-tert-butyl-4-hydroxyphenyl)propionate or a structure containing a residue of 3,3-bis-(4'-hydroxy-3'-t-butylphenyl)butanoic acid.

3. The method of claim 1, wherein the UV absorber of the Formula 1 has a melting point of 160° C. or higher.

4. The method of claim 1, wherein at least one antioxidant is present which is selected from the group consisting of p-octylphenol antioxidants, and compounds having CAS numbers 67845-93-6, 128-37-0, 31851-03-3, 1843-03-4, 85-60-9, and 35958-30-6.

5. The method of claim 1, wherein the film has a yellow value db of less than 2, determined on a laminate consisting of the film with a thickness of 0.76 mm between 2 panes of clear glass having a thickness of 2 mm.

6. The method according to claim 1, wherein the films contain one or more metal ions from the group Be, Mg, Ca, Sr, Ba, Zn and Al in a proportion of more than 5 ppm based on the weight of the film.

7. The method according to claim 1, wherein the film comprises at least one sterically hindered amine of the HALS or NOR-HALS as a light stabiliser.

8. The method according to claim 1, wherein the polyvinyl acetal has a polyvinyl alcohol content from 12 to 24% by weight.

9. The method of claim 1, wherein (2,2'methanediylbis[6-(2H- benzotriazol-2-yl)-4-(2,4,4-trimethylpentan-2-yl)phenol is used as a UV absorber of Formula 1.

10. The method of claim 1, wherein a UV absorber having a melting point of more than 100° C. is used as one UV absorber of Formula 1.

11. A process for the production of glass laminates, comprising laminating at least one layer of glass to a film of claim 1.

12. A museum glazing, display window glazing, motor vehicle glazing, aircraft glazing, photovoltaic modules, LED or OLED screen, television screen, computer screen, electrochromic glass element, photochromic glass element, or photoelectrochromic glass element, comprising at least one laminate of glass and a film of claim 1.

13. The method of claim 1, wherein the carrier liquid is the plasticizer.

14. The method of claim 6, wherein the metal of the one or more metal ions is magnesium, supplied as magnesium acetate.

15. The method of claim 1, wherein the polyvinyl acetal is prepared by acetalization of a polyvinyl alcohol having an extinction coefficient of 1 or less, measured at a wavelength of 280 nm in a 4% by weight aqueous solution.

16. The method of claim 1, wherein the polyvinyl acetal has an alkali metal titre of from 2-70 ppm.

* * * * *